(12) United States Patent
Futatsugi

(10) Patent No.: US 10,736,183 B2
(45) Date of Patent: Aug. 4, 2020

(54) WINDSHIELD HEATING DEVICE FOR ONBOARD CAMERA

(71) Applicant: TOYOTA JIDOSHA KABUSHIKI KAISHA, Toyota-shi, Aichi (JP)

(72) Inventor: Tomohiko Futatsugi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 15/869,730

(22) Filed: Jan. 12, 2018

(65) Prior Publication Data

US 2018/0213610 A1  Jul. 26, 2018

(30) Foreign Application Priority Data

Jan. 25, 2017  (JP) .................................. 2017-011382

(51) Int. Cl.
| | | |
|---|---|---|
| B60R 11/00 | (2006.01) | |
| B60R 11/04 | (2006.01) | |
| H05B 3/84 | (2006.01) | |
| B60S 1/02 | (2006.01) | |

(52) U.S. Cl.
CPC .............. *H05B 3/84* (2013.01); *B60R 11/04* (2013.01); *B60R 2011/0026* (2013.01); *B60S 1/026* (2013.01); *H05B 2203/007* (2013.01)

(58) Field of Classification Search
CPC ............... H05B 3/84; H05B 2203/007; H05B 2203/002; H05B 2303/005; H05B 2303/006; B60S 1/0848; B60S 1/56; B60S 1/023; B60S 1/026; B60R 2011/0026; B60R 11/04

USPC ................. 219/203, 522, 541–543, 546–548
See application file for complete search history.

(56) References Cited

U.S. PATENT DOCUMENTS

| | | | | |
|---|---|---|---|---|
| 5,015,986 A | * | 5/1991 | Uchida ................ | H01C 1/1406 |
| | | | | 219/548 |
| 2011/0233248 A1 | | 9/2011 | Flemming et al. | |
| 2012/0193341 A1 | | 8/2012 | Reul et al. | |
| 2017/0334366 A1 | * | 11/2017 | Sliwa ..................... | B60R 11/04 |

FOREIGN PATENT DOCUMENTS

| | | |
|---|---|---|
| EP | 2 830 390 A1 | 1/2015 |
| JP | H08-138842 A | 5/1996 |
| JP | 2004-276857 A | 10/2004 |
| JP | 2013-513538 A | 4/2013 |

(Continued)

OTHER PUBLICATIONS

Jun. 26, 2018 European Search Report issued in European Patent Application No. 18153505.5.

*Primary Examiner* — David J Walczak
(74) *Attorney, Agent, or Firm* — Oliff PLC

(57) ABSTRACT

A windshield heating device for an on-board camera includes a PTC heater in the form of a sheet extending along an inner surface of a windshield in proximity to an on-board camera that takes an image of the front of a vehicle, and is configured to heat the windshield in a heated region in front of the camera. The PTC heater includes a first heating region and a second heating region which are adjacent to each other, the heating area of the second heating region is smaller than the heating area of the first heating region, and the calorific value per unit area of the second heating region is smaller than the calorific value per unit area of the first heating area.

5 Claims, 8 Drawing Sheets

(56) References Cited

FOREIGN PATENT DOCUMENTS

| | | |
|---|---|---|
| JP | 2013-151291 A | 8/2013 |
| JP | 2016-78835 A | 5/2016 |
| WO | 2016/059780 A1 | 4/2016 |
| WO | 2016/085636 A1 | 6/2016 |

* cited by examiner

WINDSHIELD HEATING DEVICE FOR ONBOARD CAMERA

CROSS-REFERENCE TO RELATED APPLICATION

The disclosure of Japanese Patent Application NO. JP2017-11382 filed on Jan. 25, 2017 is incorporated by reference in its entirety.

BACKGROUND

1. Technical Field

The present disclosure relates to a windshield heating device for a camera mounted on a vehicle such as an automobile.

2. Description of the Related Art

In a vehicle in which a driving assist control is performed by such a preventive safety systems, a driving support control sensor, such as a pre-crash safety sensor (abbreviated as "PCS sensor") has been installed at the top center of an inner surface of a windshield (a windscreen). The driving support control sensor includes an on-board camera such as a CCD camera and the on-board camera is configured to photograph the front of the vehicle through the a windshield.

When an outside air temperature as in winter is low and a temperature difference between the inside and outside of a vehicle increases, condensation occurs on an inner surface of a windshield, which causes the windshield fogged. When the windshield is fogged, it becomes impossible to properly photograph the front of the vehicle by an on-board camera. Such that, as described in Japanese Patent Application Laid-Open Publication No. 2013-151291, for example, it is known to remove a fog of a windshield by heating the windshield in front of the camera by a windshield heating device.

A windshield heating device includes a sheet-like electric heating element, such as a PTC heater, and the electric heating element is fixed by adhering to an inner surface of a windshield close to a camera. The electric heating element shall be of a size sufficient to heat the windshield effectively, but it is not allowed to interfere with an imaging range of the camera. Therefore, it is known to form an electric heating element to have a main heating region (a first heating region) that exerts a major heating function at a position close to the camera, and an auxiliary heating region (a second heating region) that exerts an auxiliary heating function. The auxiliary heating region is spaced transversely of the vehicle with respect to an optical axis of the camera, for example. Although an area of the main heating region is greater than an area of the auxiliary heating region, as the main heating region and the auxiliary heating region are formed with the same PTC heater, calorific values per unit area of both heating regions are the same.

SUMMARY

In a conventional windshield heating device in which an electrical heating element has a main heating region and an auxiliary heating region as described above, it has been found that by heating of a windshield by the heating device, high tensile stresses are generated in the region around the auxiliary heating region. As described in detail later, when a windshield is heated by the heating device, since a heating area of the main heating area is large, a temperature of the region surrounding the main heating region also becomes higher. Accordingly, the main heating region and the surrounding region can relatively easily expand in the direction of the plane of the windshield.

In contrast, as a heating area of the auxiliary heating region is small, the temperature of the region surrounding the auxiliary heating region does not become higher as the surrounding region of the main heating region. Therefore, since a restraint for expansion of the auxiliary heating area by the surrounding region is strong, high tensile stress in the direction along the outer periphery of the auxiliary heating region are generated in the region around the auxiliary heating region by expansion forces due to the expansion of the auxiliary heating region. The auxiliary heating region cannot easily expand in the planar direction of the windshield and expands to deform in the direction perpendicular to the plane of the windshield, resulting in that regions inclined with respect to an original plane of the windshield are generated around the auxiliary heating region.

Incidentally, if a calorific value per unit area of the electric heating element is set low so as to prevent the above-mentioned problems from occurring, not only a calorific value of the auxiliary heating region but also a calorific value of the main heating region are reduced. Therefore, it becomes impossible to effectively heat the windshield to effectively remove a fog of the windshield.

The present disclosure provides a windshield heating device having a main heating region and an auxiliary heating region that is improved to reduce a risk that high tensile stresses are generated in the region around the auxiliary heating region without reducing a defogging effect at a windshield.

According to the present disclosure, there is provided a windshield heating device for an on-board camera that comprises a sheet-like electric heating element extending along an inner surface of a windshield adjacent to an on-board camera photographing the front of a vehicle and is configured to heat the windshield in a heated region in front of the on-board camera.

The electric heating element comprises a first and a second heating regions adjacent to each other; a heating area of the second heating region is smaller than a heating area of the first heating region; and a calorific value per unit area of the second heating region is smaller than a calorific value per unit area of the first heating region.

According to the above configuration, a heating area of the second heating region is smaller than a heating area of the first heating region; and a calorific value per unit area of the second heating region is smaller than a calorific value per unit area of the first heating region. Consequently, as compared with a conventional heating device in which the first and second heating regions are formed by the same heating element, temperature of the second heating region can be lowered and temperature gradients in the periphery of the second heating region can be made gentle. Therefore, it is possible to reduce tensile stresses that are generated in the periphery of the second heating region by expansion force due to an expansion of the second heating region, and to reduce a degree that the second heating region is deformed to expand in the direction perpendicular to the plane of the windshield.

Notably, a heating area of the first heating region is greater than a heating area of the second heating region; and a calorific value per unit area of the first heating region is greater than a calorific value per unit area of the second heating region. Accordingly, as the heated region can effectively be heated by the first heating region, reduction in defogging effect at the windshield can be avoided.

In one aspect of the present disclosure, the electric heating element is a PTC heater which includes a PTC element in which conductive particles are dispersed in a nonconductive matrix and a pair of electrodes spaced apart by the PTC element, and an upper limit temperature of the PTC heater in the second heating region is lower than an upper limit temperature of the PTC heater in the first heating region and is higher than a target heating temperature at a preset reference point in the heated region.

According to the above aspect, as the electric heating element is a PTC heater, there is no need, for example, to detect a temperature of the electric heating element or the heated region and to control an energization of the electric heating element on the basis of the detected temperature. The upper limit temperature of the PTC heater in the second heating region is lower than the upper limit temperature of the PTC heater in the first heating region and is higher than a target heating temperature at a preset reference point in the heated region. Therefore, according to this aspect, the temperature of the second heating region can be lowered than the temperature in a conventional heating device, and it is possible to ensure a situation in which the second heating region contributes to raise the temperature of the reference point in the heated region to not less than the target heating temperature.

In another aspect of the present disclosure, a spacing between the electrodes of the PTC heater in the second heating area is greater than a spacing between the electrodes of the PTC heater in the first heating region.

According to the above aspect, by using, for example, the same PTC elements in the first and second heating regions and varying the spacing between the electrodes in one heating region from that in the other heating region, the above-mentioned spacing relationship between the electrodes can easily be achieved. Therefore, according to this aspect, it is possible to easily and inexpensively achieve the above-described relationship of the calorific value per unit area and the upper limit temperature.

In another aspect of the present disclosure, a thickness of the PTC heater in the second heating region is less than a thickness of the PTC heater in the first heating region.

According to the above aspect, by increasing, for example, the number of sheet-like PTC elements stacked in the first heating region than that in the second heating region, the above-mentioned thickness relationship of the PTC heater can be relatively easily attained. Therefore, according to this aspect, a PTC heater having the first and second heating regions can be formed by using the same sheet-like PTC elements.

In another aspect of the present disclosure, a dispersion density of the conductive particles in the PTC element in the second heating area is lower than a dispersion density of the conductive particles in the PTC element in the first heating region.

According to the above aspect, by making, for example, the number of conductive particles per unit volume of the PTC element in the first heating region and/or the size of the conductive particles larger than that in the second heating region, the above-mentioned relationship of the dispersion density of the conductive particles can be relatively easily achieved. Therefore, according to this aspect, a PTC heater having the first and second heating regions can be formed by using two kinds of sheet-like PTC elements having different dispersion density of conductive particles due to the difference in the number of conductive particles per unit volume and/or the size of the conductive particles.

In another aspect of the present disclosure, the first heating region includes a portion located between the on-board camera and the windshield, and the second heating region is spaced apart in a lateral direction of the vehicle with respect to an optical axis of the on-board camera as viewed in a direction perpendicular to the windshield.

According to the above aspect, the heated region is mainly heated by the heat conduction and radiation from the side of the camera by the first heating region, and is supplementally heated by the heat conduction and radiation in the lateral direction of the vehicle by the second heating region. Thus, while avoiding that the second heating region from interfering with an imaging range of the camera, it is possible to make the second heating region contribute to heat the heated region.

In the present application, "upper limit temperature" of the PTC heater means a temperature at which the temperature rise rate of the PTC heater decreases with the lapse of time and the temperature of the PTC heater becomes constant due to a PTC characteristic of the PTC element.

Other objects, other features and attendant advantages of the present disclosure will be readily understood from the description of the embodiments of the present disclosure described with reference to the following drawings.

DETAILED DESCRIPTION

Figure 1:
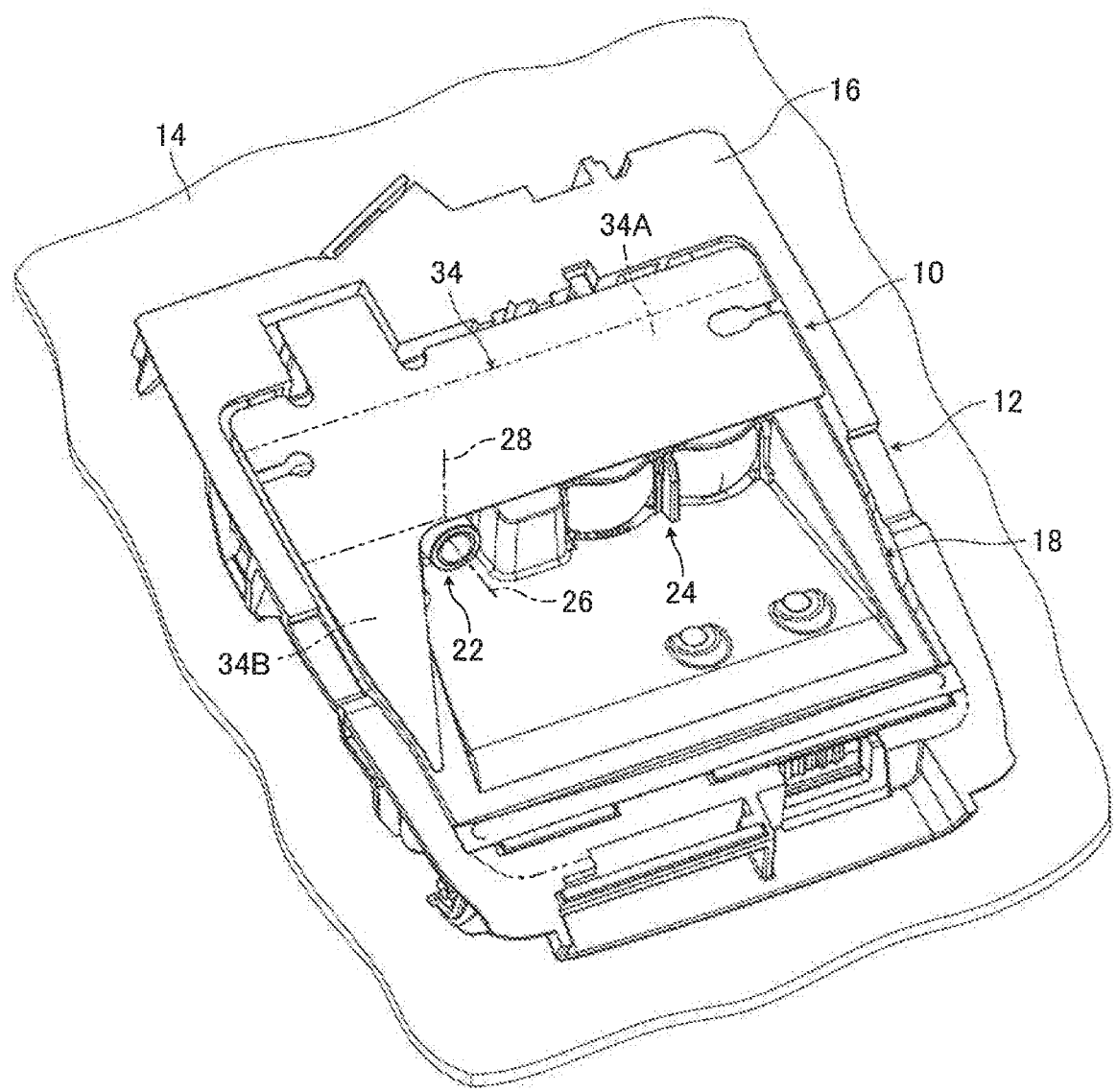
FIG. 1 is a perspective view showing, as obliquely viewed from the outside of a vehicle, a pre-crash safety sensor in which a windshield heating device for an on-board camera according to an embodiment of the present disclosure is incorporated.

An embodiment of the present disclosure will now be described in detail with reference to the accompanying drawings.

Embodiment

A windshield heating device 10 for an on-board camera according to an embodiment of the present disclosure (abbreviated as "heating device") is applied to a PCS sensor 12. The PCS sensor 12 includes a support base member 16 made from resin which is fixed to the inner surface of a windshield 14 by means such as an adhesive, a sensor body 18 which is removably attached to the base member, a cover, not shown, covering the sensor body. The sensor body 18 includes a CCD camera 22 and a radar sensor device 24 adjacent to each other in the lateral direction of the vehicle 20 (see FIG. 2). The configuration of the PCS sensor 12 is not critical to the present disclosure and the PCS sensor 12 may have any configuration as long as it has a camera for photographing the front of the vehicle through the windshield 14. If necessary, for more information about the PCS sensor 12, see Japanese Patent Application Laid-Open Publication No. 2016-144966 filed by the applicant of the present application, for example.

Figure 2:
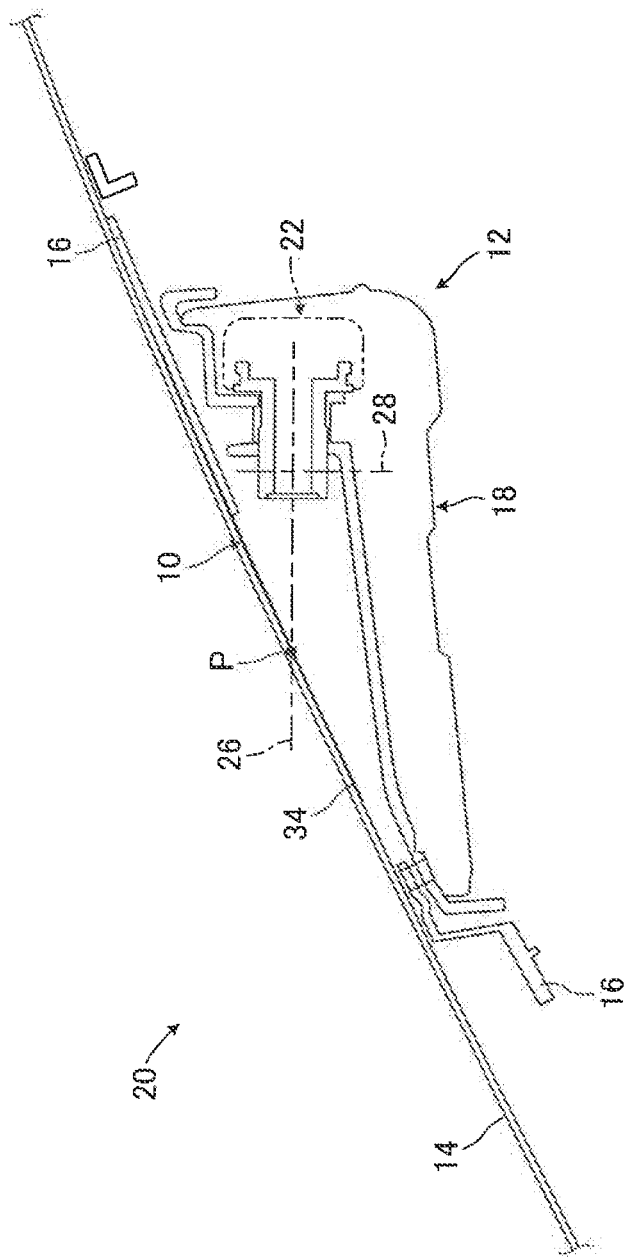
FIG. 2 is a sectional view cutting the pre-crash safety sensor in a vertical cutting plane passing through an optical axis of the camera and omitting hatching.

The camera 22 is an on-board camera configured to photograph the front of the vehicle 20 along an optical axis 26. In FIGS. 1 and 2, a dashed line 28 indicates a position of lens, not shown, of the camera 22 and a two-dot chain line 30 indicates a range of an angle of view of the camera 22. A point P indicates an intersection of the optical axis 26 and the inner surface of the windshield 14 and is a preset reference point in a heated region 32 of the windshield 14 to be heated by the heating device 10. Incidentally, the preset reference point in the heated region 32 may be set to a position other than the intersection point P of the optical axis 26 and the inner surface of the windshield 14.

Figure 4:
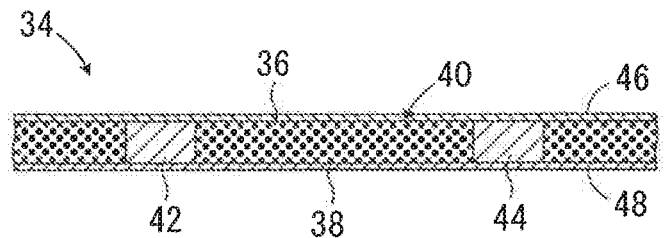
FIG. 4 is an enlarged partial sectional view of an electrical heating element (PTC heater) cut perpendicularly to its plane.

The heating device 10 is configured to heat the windshield 14 in the heated region 32 in front of the camera 22, and includes a sheet-like electric heating element 34. The electric heating element 34 extends along the windshield 14 in proximity to the camera 22, and is fixed to the inner surface of the windshield 14 by means such as an adhesive. As shown in FIG. 4, the electric heating element 34 includes a PTC element 40 in which conductive particles 38 such as carbon particles are dispersed in a nonconductive matrix 36 made of semiconductor particles or the like, and electrodes 42 and 44 spaced by the PTC element.

Notably, in FIG. 4, reference numerals 46 and 48 indicate protective sheets that cover the PTC element 40 and the electrodes 42 and 44, and the protective sheets 46 and 48 may be made of a non-conductive resin such as polyethylene terephthalate (PET). Further, although it is preferable that, as shown in FIG. 4, the conductive particles 38 are uniformly dispersed in the matrix 36, the dispersion of the conductive particles may not be uniform. Furthermore, although not shown in FIG. 4, the electrodes 42 and 44 are preferably comb electrodes having a plurality of comb teeth that are alternately arranged along the plane of the electric heating element 34.

The electric heating element 34, i.e. PTC heater includes a first heating region 34A and a second heating region 34B adjacent to each other, and a heating area (S2) of the second heating region is smaller than a heating area (S1) of the first heating region 34A. In the illustrated embodiment, the first heating region 34A is substantially rectangular extending in the lateral direction of the vehicle 20, and the main part thereof is arranged between the camera 22 and the radar sensor device 24 and the windshield 14.

Figure 3:
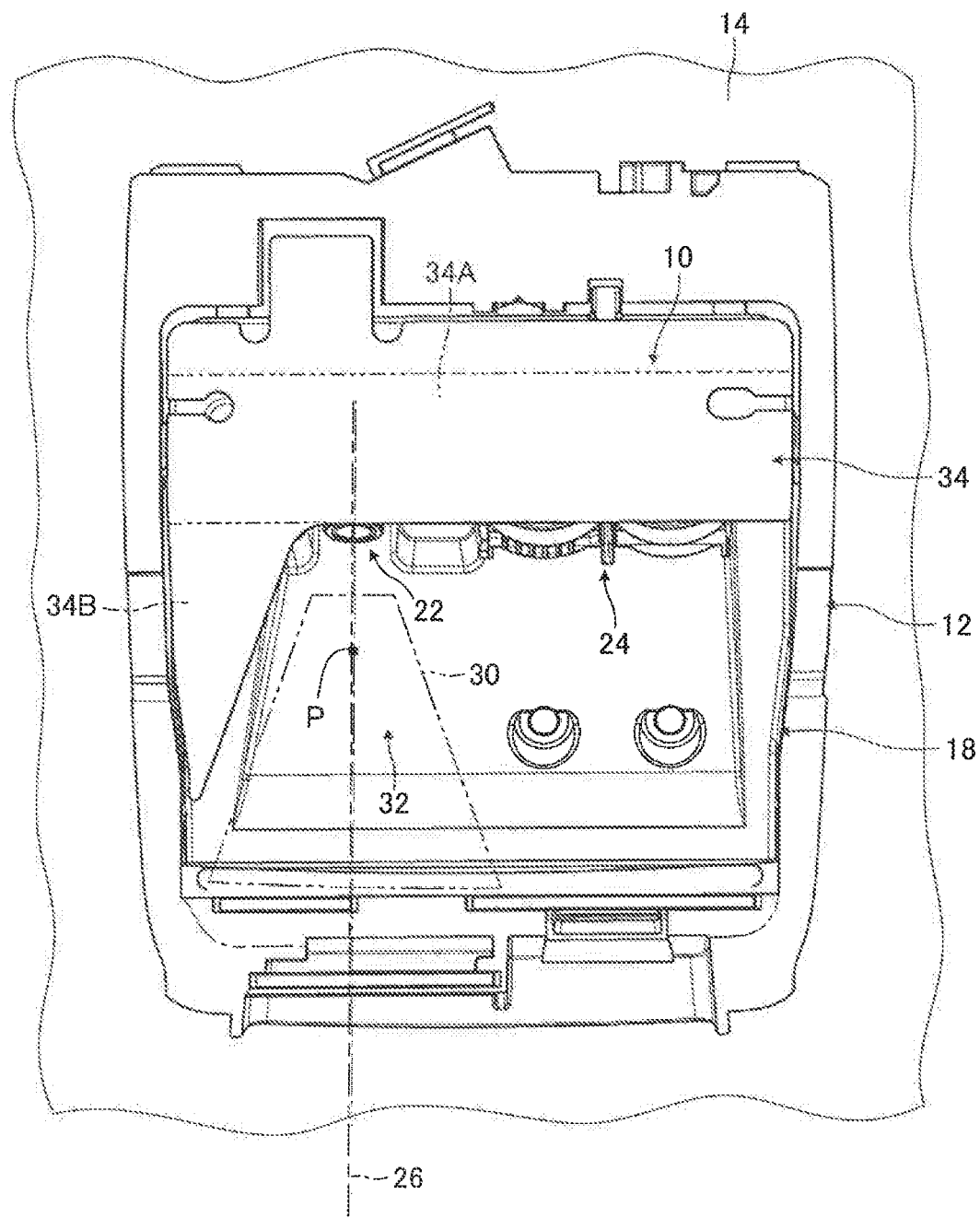
FIG. 3 is a plan view showing the pre-crash safety sensor as viewed perpendicularly to the windshield from the outside of the vehicle.

As shown in FIGS. 1 and 3, the second heating region 34B is substantially forms a triangular projecting forwardly and downwardly from the first heating region 34A, and, as viewed in the direction perpendicular to the windshield 14, is spaced apart in the lateral direction of the vehicle with respect to the optical axis 26 of the camera 22. Therefore, the first heating region 34A is located closer to the camera 20 than the second heating region 34B, and the second heating region 34B also does not interfere with an imaging range of the camera 22. Although the longitudinal directions of the first heating region 34A and the second heating region 34B substantially intersect perpendicularly, the longitudinal directions of the two heating regions may intersect at an angle other than perpendicular.

Figure 10:
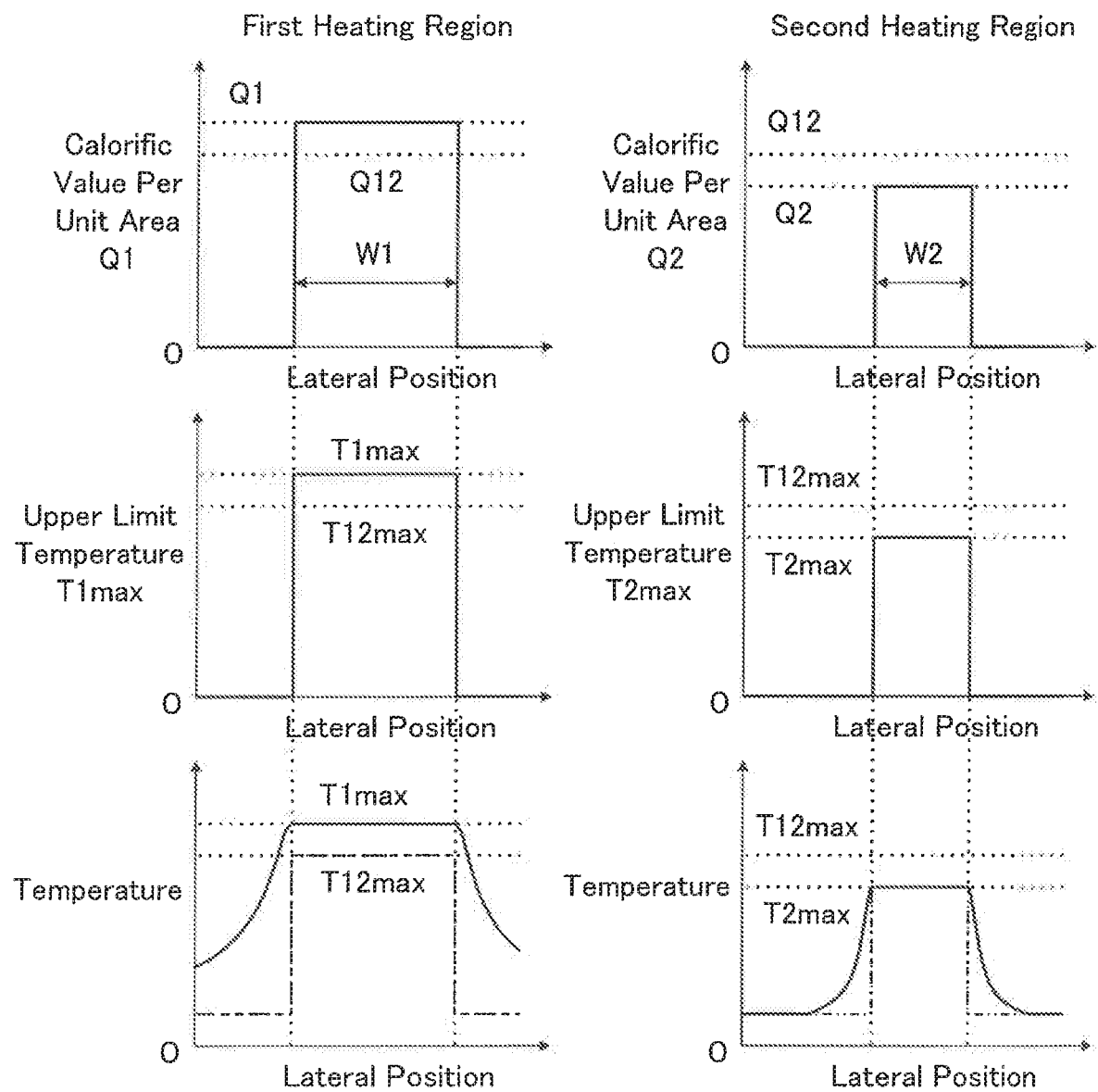
FIG. 10 is a diagram showing a calorific value per unit area (top), an upper limit temperature (middle) and a temperature gradient (lower) immediately after the PTC heater becomes a steady state for the first and second heating regions of the windshield heating device according to the embodiment.

As shown in FIG. 10 to be described later, a calorific value Q2 per unit area of the second heating region 34B is smaller than a calorific value Q1 per unit area of the first heating region 34A. The upper limit temperature T2max of the PTC heater 34 in the second heating region 34B is lower than the upper limit temperature T1max of the PTC heater 34 in the first heating region 34A. Therefore, the first heating region 34A functions as a main heating region and the second heating region 34B functions as an auxiliary heating region. The differences in the calorific value and the upper limit temperature may be achieved by one or any combination of the following configurations (A) to (C).

(A) A spacing between the electrodes 42 and 44 of the PTC heater 34 in the second heating region 34B is greater than a spacing between the electrodes 42 and 44 of the PTC heater 34 in the first heating region 34A.

(B) A thickness of the PTC heater 34 in the second heating region 34B is smaller than a thickness of the PTC heater 34 in the first heating region 34A.

(C) A dispersion density of the conductive particles 38 of the PTC element 40 in the second heating region 34B is lower than a dispersion density of the conductive particles 38 of the PTC element 40 in the first heating region 34A.

Further, the upper limit temperature T2max of the PTC heater 34 in the second heating region 34B is higher than a target heating temperature (Tht) of the reference point P in the heated region 32. This relationship between the temperatures may be achieved by appropriately setting the spacing between the electrode 42 and 44 and/or the dispersion density of the conductive particles 38 in the PTC heater 34 in the second heating region 34B. Incidentally, the target heating temperature (Tht) of the reference point P in the heated region 32 is preset as a temperature that can remove fog in the heated region 32 of the windshield 14 in a situation where an outside air temperature is low.

Figure 5:
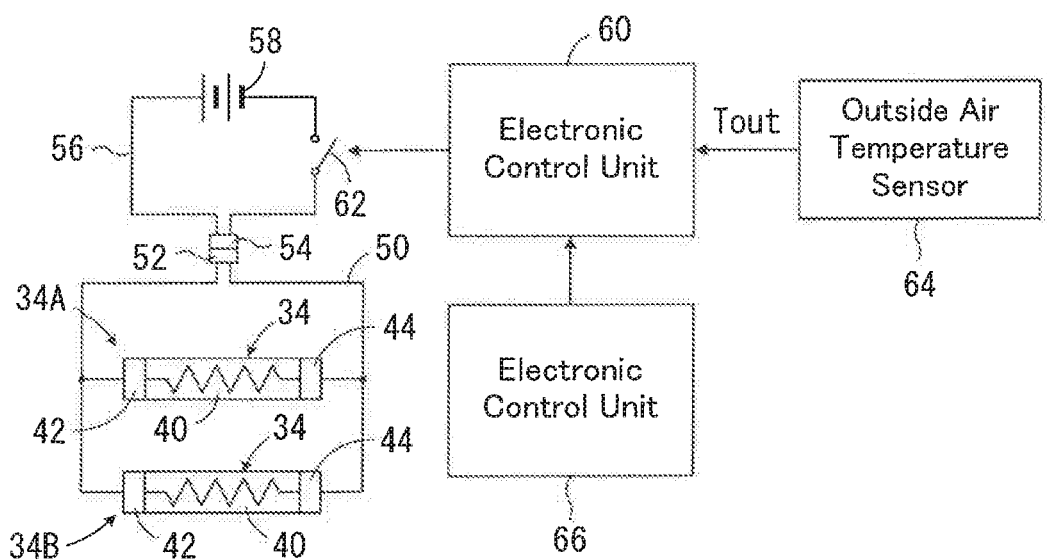
FIG. 5 is an electrical circuit diagram of the windshield heating device according to the embodiment.

FIG. 5 shows an electric circuit of the heating device 10. The first heating region 34A and the second heating region 34B of the PTC heaters 34 are connected in parallel to each other, and the electrodes 42 and 44 of the PTC heater 34 are connected to a connector 52 by a lead wire 50. A connector 54 connected to the connector 52 is connected by a lead wire 56 to a DC power supply 58 of the vehicle. Therefore, the first heating region 34A and the second heating region 34B of the PTC heater 34 are connected in parallel to the DC power source 58, and the lead wire 56 common to the two heating regions has a switch 62 that is opened and closed by an electronic control unit 60.

A signal supplied from an outside air temperature sensor 64 and indicating an outside air temperature Tout is input to the electronic control unit 60. Further, the electronic control unit 60 is supplied with a signal indicating whether or not the camera 22 cannot normally photograph the front of the vehicle 20 due to fogging in the heated region 32 from an electronic control unit 66 that controls the traveling of the vehicle 20 based on the detection result of the PCS sensor 12. The electronic control unit 60 closes the switch 62 when a predetermined operation starting condition of the heating device 10 is satisfied such as "an external temperature Tout is equal to or less than a start reference value" or when a predetermined operation continuing condition of the heating device 10 is satisfied such as "the camera 22 cannot successfully photograph the front of the vehicle 20". In contrast, the electronic control unit 60 opens the switch 62 when a predetermined operation ending condition of the heating device 10 is satisfied, such as "an outside air temperature Tout is equal to or greater than a termination reference value".

The first heating region 34A and the second heating region 34B of the PTC heater 34, when energized by the switch 62 being closed, rises in temperature in a known manner. That is, the heater generates heat by electrical resistance when DC current flows from one electrode 42 through the conductive particles 38 of the PTC element 40 to the other electrode 44. When the temperature of the PTC element 40 rises due to heat generation, the nonconductive matrix 36 expands and the distances between the conductive particles 38 increase, so that the electrical resistance of the PTC element 40 gradually increases, whereby the electric current passing through the PTC element 40 gradually decreases and eventually becomes constant.

Figure 6:
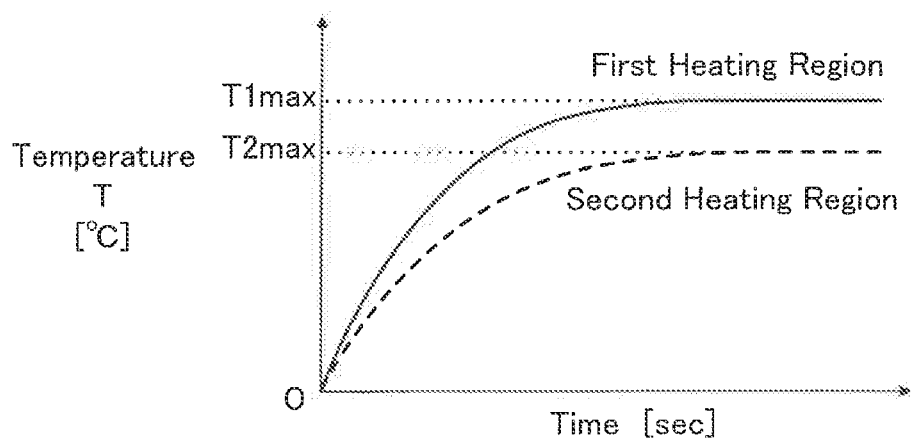
FIG. 6 is a graph showing an example of temperature change in a first and a second heating regions of the electric heating element after energization is started.

Therefore, when first heating region 34A and the second heating region 34B of the PTC heater 34 reach a steady state, as shown in FIG. 6, they maintain the maximum temperature T1max and T2max, respectively. The two heating regions of the PTC heater 34 heat the heated region 32 and the surrounding thereof in cooperation with each other so that the heating temperature (Th) of the reference point P of the heated region 32 of the windshield 14 becomes equal to or higher than the target heating temperature (Tht), whereby fogging of the windshield 14 is removed.

In the first heating region 34A and the second heating region 34B, one or any combination of the above configuration (A) to (C) is employed. Consequently, an electrical resistance of the PTC heater 34 in the second heating region 34B is higher than an electrical resistance of the PTC heater 34 in the first heating region 34A, and, accordingly, an electric current flowing through the second heating region 34B is lower than an electric current flowing through the first heated region 34A. Therefore, as described above, the calorific value Q2 per unit area of the second heating region 34B is smaller than the calorific value Q1 per unit area of the first heating region 34A. In addition, as shown in FIG. 6, the upper limit temperature T2max of the second heating region 34B is lower than the upper limit temperature T1max of the first heating region 34A. Furthermore, a contribution degree of the first heating region 34A in heating the heated region 32 and the surrounding thereof is higher than a contribution degree of the second heating region 34B.

<Contrast with Prior Art>

In a conventional windshield heating device for an on-board camera, both of the first heating region 34A and the second heating region 34B are constituted by PTC heaters of the same configuration. In other words, the above-mentioned configurations (A) to (C) are not adopted.

Figure 7:
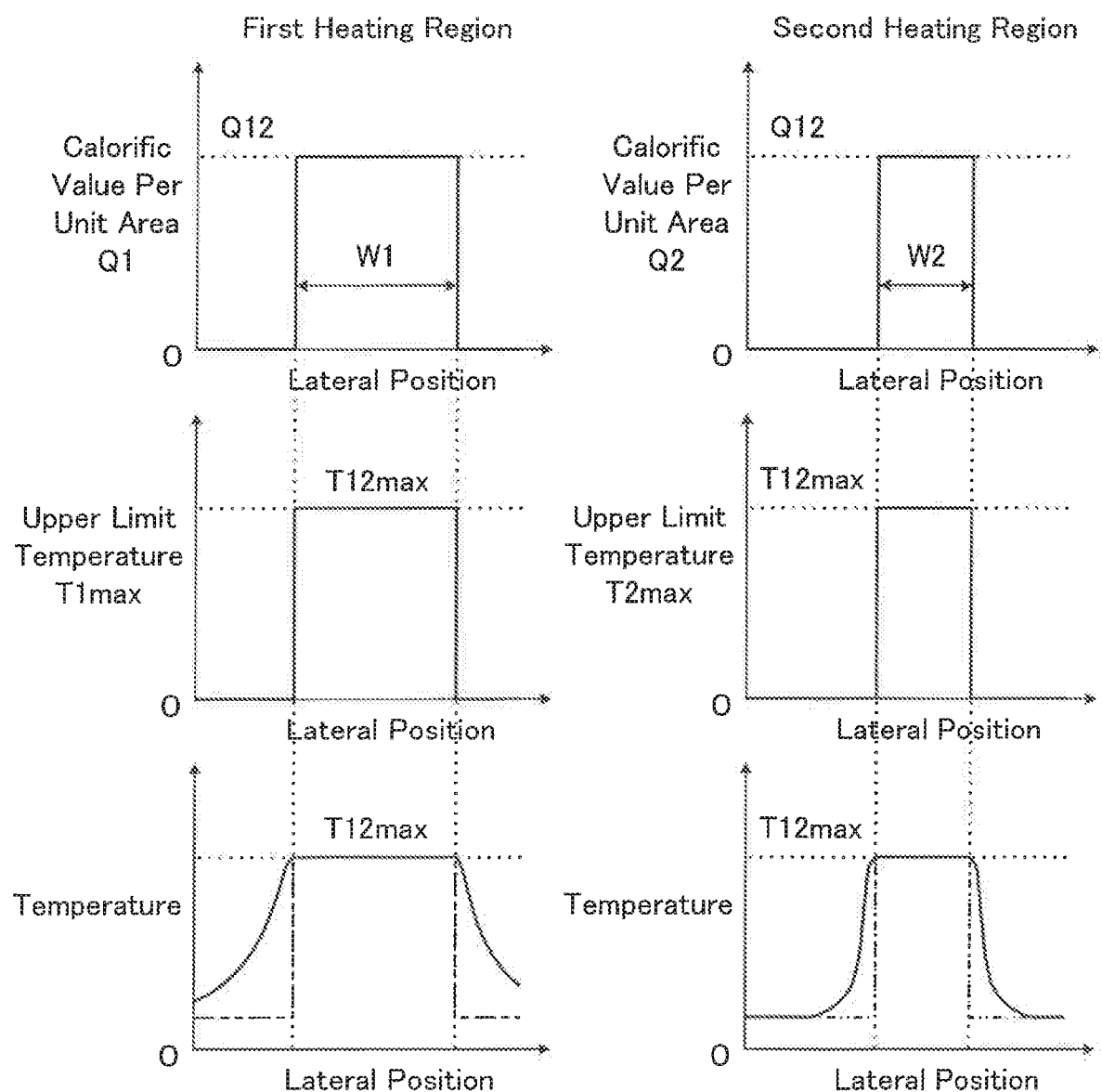
FIG. 7 is a diagram showing a calorific value per unit area (top), an upper limit temperature (middle) and a temperature gradient (lower) for the first and second heating regions of a conventional windshield heating device.

Therefore, as shown in the upper part of FIG. 7, the calorific value Q1 per unit area of the first heating region 34A and the calorific value Q2 per unit area of the second heating region 34B are identical Q12. In addition, as shown in the middle part of FIG. 7, the upper limit temperature T1max of the first heating region 34A and the upper limit temperature T2max of the second heating region 34B are also the same T12max. Furthermore, as an area (S1) of the first heating region 34A is greater than an area (S2) of the second heating region 34B, as shown in the lower part of FIG. 7, while a temperature gradient around the first heating region 34A is relatively gentle, a temperature gradient around the second heating region 34B is steep.

In FIG. 7 and FIG. 10 to be described later, the "Lateral Position" on the horizontal axis means a position located in a direction that is along the plane of the first heating region 34A or the second heating region 34B and is perpendicular to the longitudinal direction of the heating region. Further, W1 is a width of the first heating region 34A, and W2 is a width of the second heating region 34B at the center in its longitudinal direction. The widths W1 and W2 are less than the longitudinal lengths of the first heating region 34A and the second heating region 34B, respectively.

Figure 8:
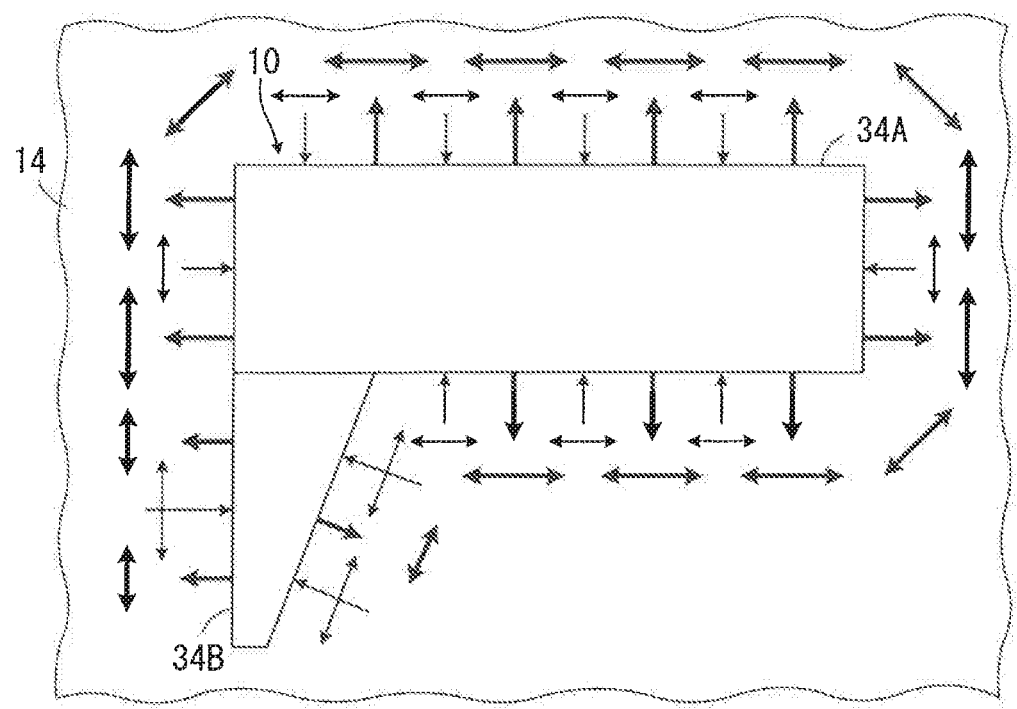
FIG. 8 is a diagram illustrating a status of expansion and stress in the first and second heating regions and in the surrounding thereof in a conventional windshield heating device.

As a temperature around the first heating region 34A is relatively high, restraint against expansion of the first heating region 34A by the region around thereof is weak. Consequently, as shown in FIG. 8, the windshield 14 around the first heating region 34A is relatively easily expandable along its plane. Accordingly, since the windshield 14 in the first heating region 34A is also relatively easily expandable along its plane, thermal stresses in the first heating region 34A and the surrounding thereof are relatively low. In FIG. 8 and FIG. 10 to be described below, the bold arrows and bold double-headed arrows indicate the directions of expansion, and the thin arrows and thin double-headed arrows indicate the directions of restraining force and tensile stress, respectively. Further, the lengths of the bold arrows and the bold double-headed arrows indicate the degree of expansion, and the lengths of the thin arrows and the thin double-headed arrows represent the magnitudes of the restraining force and tensile stress, respectively.

Figure 9:
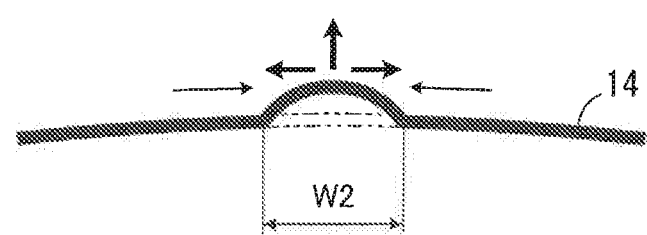
FIG. 9 is a sectional view showing an exaggerated deformation of the windshield in the second heating region in a conventional windshield heating device.

On the other hand, as the temperature around the second heating region 34B is low, as shown in FIG. 8, restraint against expansion of the second region 34B by the region around thereof is strong. Consequently, high tensile stresses are generated in the region around the second heating region 34B by the expansive force due to the expansion of the second heating region 34B. As the windshield 14 in the second heating region 34B cannot easily expand along its plane, as shown in FIG. 9, the windshield 14 in the second heating region 34B expands and deforms outwardly in a direction perpendicular to the plane thereof.

In contrast, in the embodiment, at least one of the above-mentioned configurations (A) to (C) is adopted. Therefore, as shown in the upper part of FIG. 10, the calorific value Q2 per unit area of the second heating region 34B is smaller than the calorific value Q1 per unit area of the first heating region 34A. In addition, as shown in the middle part of FIG. 10, the upper limit temperature T2max of the second heating region 34B is lower than the upper limit temperature T1max of the first heating region 34A. Furthermore, as shown in the lower part of FIG. 10, the temperature gradient around the first heating region 34A is relatively gentle as in a conventional heating device, and the temperature gradient around the second heating region 34B is steeper than the temperature gradient around the first heating region 34A but is milder than that in the conventional heating device.

Figure 11:
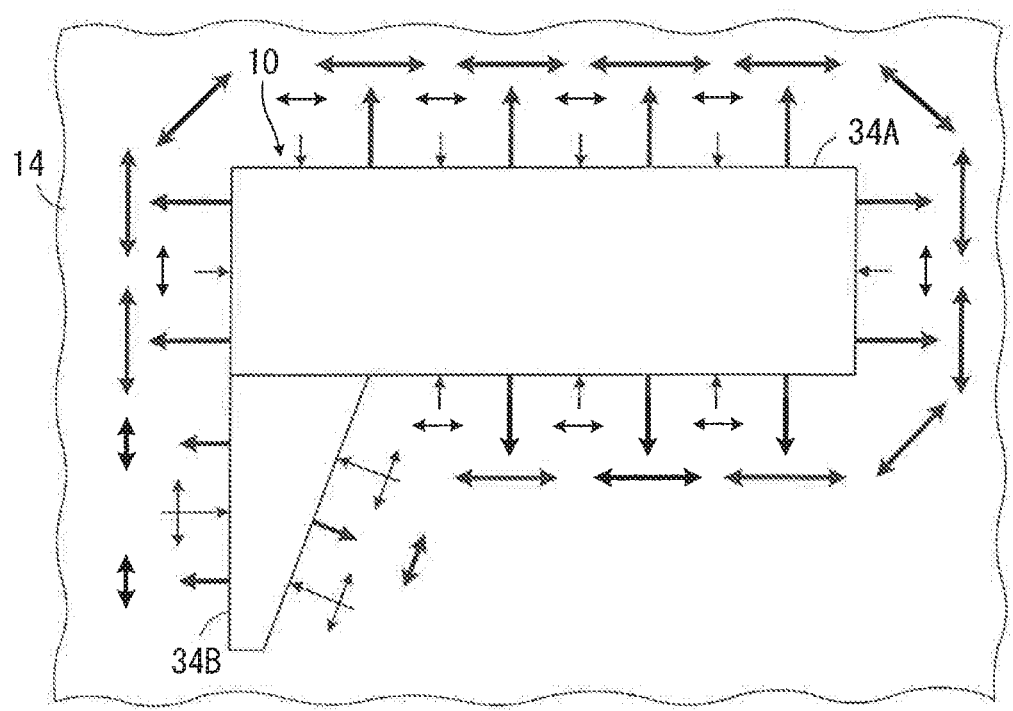
FIG. 11 a diagram illustrating a status of expansion and stress in the first and second heating regions and in the surrounding thereof in the windshield heating device according to the embodiment.

The temperature around the first heating regions 34A is higher than that in the conventional heating device, and, accordingly, as in the conventional heating device, restraint against the expansion of the first heating region 34A by the region around thereof is weak. Consequently, as shown in FIG. 11, windshield 14 around the first heating region 34A can relatively easily expand along its plane. Therefore, as the windshield 14 in the first heating region 34A can also relatively easily expand along its plane, the thermal stresses in the first heating region 34A and the surrounding thereof is relatively low.

On the other hand, as the temperature in the second heating region 34B may be low as compared with the conventional heating device, it is possible to reduce a difference between the temperature of the second heating region 34B and the temperature in the region around thereof as compared to that in the conventional heating device. Therefore, as shown in FIG. 11, restraint against expansion of the second region 34B by the region around thereof is weak, and, accordingly, tensile stresses that are generated in the region around the second heating region 34B by the expansive force due to the expansion of the second heating region is lower as compared with those in the conventional heating device. Also, an amount that the windshield 14 in the second heating region 34B expands to deform in the direction perpendicular to the plane thereof is also smaller as compared with that in the conventional heating device.

Incidentally, a heating area (S1) of the first heating region 34A is greater than a heating area (S2) of the second heating region 34B; and a calorific value Q1 per unit area of the first heating region is greater than a calorific value Q2 per unit area of the second heating region. Accordingly, as the heated region 32 can effectively be heated by the first heating region 34A, reduction in defogging effect of the windshield 14 can be avoided.

The calorific value Q1 per unit area of the first heating region 34A and the calorific value Q2 per unit area of the second heating region 34B may be set appropriately, as far as the two heating regions of the PTC heater 34 can cooperate to perform heating so that a heating temperature (Th) at the reference point P becomes equal to or higher than a target heating temperature (Tht). Further, the upper limit temperature T1max of the first heating region 34A and the upper limit temperature T2max of the second heating region 34B may be set appropriately, as far as the upper limit temperature T1max is higher than the upper limit temperature T2max and the upper limit temperature T2max is higher than the target heating temperature (Tht) of the reference point P in the heated region 32.

For example, assuming that an increase amount of the calorific value Q1 per unit area of the first heating region 34A in comparison to a conventional heating device is represented by $\Delta Q1$ (=Q1−Q12), and a decrease amount of the calorific value Q2 per unit area of the second heating region 34B is represented by $\Delta Q2$ (=Q12−Q2). A total calorific value Qp in a conventional heating devise and a total calorific value Qe in the embodiment are represented by the following equations (1) and (2), respectively.

$$Qp = Q12(S1+S2) \qquad (1)$$

$$Qe = Q1 \cdot S1 + Q2 \cdot S2 = Q12(S1+S2) + \Delta Q1 \sim S1 - \Delta Q2 \cdot S2 \qquad (2)$$

Therefore, If the calorific values Q1, Q2 and the areas S1, S2 are set so that $\Delta Q1 \cdot S1$ and $\Delta Q2 \cdot S2$ become equal to each other, the total calorific value Qe in the embodiment becomes equal to the total calorific value Qp in the conventional heating device, the power consumption amount in the embodiment can be made equal to the power consumption amount in the conventional heating device.

In particular, in the embodiment, the electric heating element 34 having the first and second heating regions is a PTC heater which includes a PTC element 40 in which conductive particles 38 are dispersed in a nonconductive matrix 36, and electrode 42 and 44 spaced by the PTC element. Therefore, when electric current is supplied to the PTC heater, temperatures of the first heating region 34A and the second heating region 34B are automatically controlled to be the maximum temperature T1max and T2max by a PTC characteristic. Therefore, according to the embodiment, for example, it is unnecessary to control the energization when a resistive wire heater, for example, is used as the electric heating element. That is, it is unnecessary to control the energization to the heater based on the heating temperature of the heater.

The upper limit temperature T2max of the PTC heater in the second heating region 34B is lower than the upper limit temperature T1max of the PTC heater in the first heating region 34A and higher than the target heating temperature (Tht) of the reference point P in the heated region 32. Therefore, while decreasing the tensile stress around the second heating region 34B than that in the conventional heating device, it is possible to increase the degree of contribution of the PTC heater in the heating region 34B as compared to where the upper limit temperature T2max is equal to or lower than the target heating temperature (Tht).

In the embodiment, at least one of the configurations (A) to (C) is adopted as described above in order to achieve the relationships of the calorific values per unit area and the upper limit temperatures for the first and second heating regions.

The configuration (A) can easily be achieved by, for example, using the same PTC element 40 in the first heating region 34 A and the second heating region 34 B and varying the spacing between the electrodes 42 and 44 in the two heating regions. Therefore, according to this configuration, the above relationships of the calorific values per unit area and the upper limit temperatures can easily and inexpensively be achieved.

The configuration (B) can relatively easily be achieved by, for example, by increasing the stack number of the sheet-like PTC element 40 in the first heating region 34A than in the second heating region 34B. Therefore, according to this configuration, a PTC heater having the first and second heating regions 34A and 34B can be formed using the same sheet-like PTC element 40.

Furthermore, the configuration (C) can relatively easily be achieved by, for example, making the number of the conductive particles 38 per unit volume and/or the size of the conductive particles 38 of the PTC element 40 in the first heating region 34A larger than that in the second heating region 34B. Therefore, according to this configuration, the PTC heaters having the first and second heating regions 34 A and 34 B can be formed by using two kinds of sheet-like PTC elements 40 having different conductive particles 38 and different number of conductive particles 38 and/or different sizes of conductive particles 38.

Further, in the embodiment, the first heating region 34A includes a portion located between the camera 22 and the windshield 14, and the second heating region 34B is spaced in the lateral direction of the vehicles 20 with respect to the optical axis 26 of the camera 22 as viewed in the direction perpendicular to the windshield 14. Thus, according to the embodiment, the heated region 32 can mainly be heated by the heat conduction and radiation from the side of the camera 22 by the first heating region 34A and supplementarily heated by the heat conduction and radiation in the lateral direction of the vehicle 20 by the second heating region 34B. Therefore, it is possible to reliably make the second heating region 34B contribute to heat the heated region 32 while avoiding the second heating region 34B from interfering with the photographing range of the camera 22.

Further, in the embodiment, the first heating region 34A and the second heating region 34B are connected in parallel to the DC power source 58. Therefore, the first heating region 34A and the second heating region 34B can be applied to the same voltage.

Further, in the embodiment, the first heating region 34A and the second heating region 34B are connected in parallel to the DC power source 58, and the switch 62 is provided in the lead wire common to the first and second heating regions, namely in the lead wire 56 between the connector 54 and the DC power source 58. Therefore, the number of parts can be reduced as compared to where the switches are provided on the lead wires peculiar to the first and second heating regions, and the two heating regions can concurrently conducted and interrupted by opening and closing one switch 62 by means of the electronic control unit 60.

Although the present disclosure has been described in detail with reference to specific embodiments, it will be apparent to those skilled in the art that the present disclosure is not limited to the above-described embodiments, and various other embodiments are possible within the scope of the present disclosure.

For example, while in the above-described embodiment, the first heating region 34A and the second heating region 34B of the PTC heater 34 are connected in parallel to the DC power source 58, they may be independently connected to the DC power source 58. In the latter case, a switch may be provided on the lead wire between the first heating region 34A and the DC power supply 58 and the lead wire between the second heating region 34B and the DC power supply 58.

Further, while in the above-described embodiment, the electric heating element 34 is a PTC heater, it may be a resistance wire heater. In the latter case, the resistance wire heater of the first heating region 34A and the second heating region 34B may be connected in parallel to the DC power supply 58 or may be connected in series to the DC power source 58. Incidentally, when the connection to the DC power source 58 is in series, the electric resistance of the resistance wire heater of the second heating region 34B is set to a smaller value than the electrical resistance of the resistance wire heater of the first heating region 34A.

Further, while in the above-described embodiment, the PTC element 40 is an element in which conductive particles 38 are dispersed in a nonconductive matrix 36, PTC element may be made of semiconductor such barium titanate or the like that changes electric resistance by phase transformation.

Further, in the above-described embodiment, the first heating region 34A and the second heating region 34B are rectangular and triangular, respectively. However, as long as the heating area of the second heating region is smaller than the heating area of the first heating area and the calorific value per unit area of the second heating region is smaller than the calorific value per unit area of the first heating region, at least one of the heating regions may form other shapes.

Further, while in the above-described embodiment, the heating device 10 is applied to the PCS sensor 12 provided with one CCD camera 22, the heating device 10 may be applied to a driving support control sensor provided with a stereo camera. In that case, two heating devices 10 having the first heating region 34A and the second heating region 34B may be used, and each heating device may be disposed in proximity to the corresponding camera.

Further, in the above-described embodiment, the heating device 10 is applied to a PCS sensor 12 having a CCD camera 22 and a radar sensor device 24. However, the heating device 10 may be applied to a driving support control sensor having only a camera or may be applied to a driving support control sensor having a detection device other than a radar sensor device in addition to a camera. It may be further applied to a driving support control sensor provided with other detection devices in addition to the camera and the radar sensor device.

What is claimed is:

1. A vehicle comprising a windshield, an on-board camera that is fixed to an inner surface of the windshield and that is configured to photograph a front of the vehicle, and a windshield heating device for the on-board camera that comprises a sheet-like electric heating element extending along the inner surface of the windshield adjacent to the on-board camera and is configured to heat the windshield in a heated region in front of the on-board camera, wherein the electric heating element comprises a first heating region and a second heating region that are adjacent to each other;

the first heating region includes a portion located between the on-board camera and the windshield, and the second heating region is spaced apart in a lateral direction of the vehicle with respect to an optical axis of the on-board camera as viewed in a direction perpendicular to the windshield;

a heating area of the second heating region is smaller than a heating area of the first heating region; and a heat quantity per unit area of the second heating region is smaller than a heat quantity per unit area of the first heating region.

2. The vehicle according to claim 1, wherein the electric heating element is a PTC heater which includes a PTC element in which conductive particles are dispersed in a nonconductive matrix and electrodes spaced apart by the PTC element, and an upper limit temperature of the PTC heater in the second heating region is lower than an upper limit temperature of the PTC heater in the first heating region and is higher than a target heating temperature at a preset reference point in the heated region.

3. The vehicle according to claim 2, wherein a spacing between the electrodes of the PTC heater in the second heating area is greater than a spacing between the electrodes of the PTC heater in the first heating region.

4. The vehicle according to claim 2, wherein a thickness of the PTC heater in the second heating region is less than a thickness of the PTC heater in the first heating region.

5. The vehicle according to claim 2, wherein a dispersion density of the conductive particles in the PTC element in the second heating area is lower than a dispersion density of the conductive particles in the PTC element in the first heating region.

* * * * *